United States Patent [19]

Takai et al.

[11] Patent Number: 5,454,012
[45] Date of Patent: Sep. 26, 1995

[54] DIGITAL SIGNAL TRANSMISSION DEVICE FOR IMPROVEMENT OF ANTI-MULTIPATH FEATURE, A METHOD OF THE SAME AND DIGITAL SIGNAL TRANSMISSION WAVEFORM

[75] Inventors: Hitoshi Takai, Toyono; Yoshio Urabe, Ibaraki; Hidetoshi Yamasaki, Amagasaki, all of Japan

[73] Assignee: Matsushita Electric Industrial Co. Ltd., Osaka, Japan

[21] Appl. No.: 227,111

[22] Filed: Apr. 13, 1994

[30] Foreign Application Priority Data

Apr. 14, 1993 [JP] Japan ........................... 5-087409

[51] Int. Cl.⁶ ..................... H04L 27/04; H04L 27/20
[52] U.S. Cl. .................. 375/295; 375/302; 375/308; 332/103
[58] Field of Search .................. 375/40, 60, 58, 375/52, 56, 57, 59, 67, 267, 295, 296, 285, 279, 283, 284, 308, 298, 302, 309, 303; 332/103; 455/103

[56] References Cited

U.S. PATENT DOCUMENTS

| 3,958,191 | 5/1976 | Jones, Jr. .................... | 375/56 |
| 4,504,802 | 3/1985 | Heatherington ............. | 375/67 |
| 4,613,976 | 9/1986 | Sewerinson et al. .......... | 375/67 |
| 4,856,025 | 8/1989 | Takai ........................... | 375/40 |
| 5,027,372 | 6/1991 | Wong .......................... | 375/67 |

FOREIGN PATENT DOCUMENTS

| 260246 | 10/1988 | Japan ........................ | 375/52 |
| 266949 | 11/1988 | Japan ........................ | 375/52 |

OTHER PUBLICATIONS

"BER Performance of Anti Multipath Modulation PSK–VP Fits Optimum Phase Waveform" Takai, IEEE, pp. 412–419, 1990.

IEEE Transaction on Vehicular Technology, vol. 42, No. 4, Nov. 1993, pp. 625–640, "BER Performance of Anti–Multipath Modulation Scheme PSK–VP and its Optimum Phase–Waveform", by Hitoshi Takai.

IEEE Transaction on Vehicular Technology, vol. 42, No. 2, May 1993, pp. 177–185, "In–Room Transmission BER Performance of Anti–Multipath Modulation PSK–VP", by Hitoshi Takai.

*Primary Examiner*—Stephen Chin
*Assistant Examiner*—Tesfaldet Bocure
*Attorney, Agent, or Firm*—Price, Gess & Ubell

[57] ABSTRACT

A digital signal transmission device for transmitting a signal generated by modulating a carrier wave according to a binary or M-ary data sequence. Such device comprises a differentially encoding unit for converting the original data sequence into a transmission data sequence, a waveform generation unit for generating a phase transition waveform in each time slot which corresponds to each data included in the transmission data sequence, and a modulation unit for modulating the carrier wave according to a signal which has the phase transition waveform generated by the waveform generation unit. The information to be transmitted is present in a difference between two data which are spaced form each other by a prescribed time slots. The phase transition waveform includes a center part and a connection part for linking the center parts in adjacent time slots where a phase transition waveform in the center part of a present time slot is generated according to a corresponding data, then a phase transition waveform in the connection part is generated to continue on the phase transition waveform in the center parts of time slots succeeding to and preceding the present time slot without having a discontinuity even at the linking point.

19 Claims, 16 Drawing Sheets

DIGITAL SIGNAL TRANSMISSION DEVICE FOR IMPROVEMENT OF ANTI-MULTIPATH FEATURE, A METHOD OF THE SAME AND DIGITAL SIGNAL TRANSMISSION WAVEFORM

BACKGROUND OF THE INVENTION (1) Field of the Invention

The present invention relates to a digital signal transmission method of minimizing quality deterioration in high-speed radio data transmission where severe degradation is caused by a multipath propagation in urban areas or around/inside of buildings frequently.

(2) Description of the Related Art

Recently, the needs of the high-speed radio data transmission, such as a radio LAN (Local Area Network), are increasing rapidly.

The digital radio transmission in urban areas or inside of buildings, however often has the problem of degradation in transmission quality due to multipath fading caused by reflections and diffractions by buildings or walls. Particularly when the propagation delay time difference between waves increases to such an extent that it is no longer negligible with respect to the length of a time slot (symbol period), the bit error rate (BER) characteristics are severely affected by signal distortion.

As a conventional method of combatting the BER degradation, there is a scheme in which a redundant amplitude/phase transition is imposed on a basic modulation.

The conventional digital signal transmission method will be described below as referring to the drawings.

FIG. 1 shows the phase transition of a transmission signal according to the conventional digital signal transmission method. The information to be transmitted is present in a phase difference θ between waveforms in neighboring time slots; and a convex phase transition φ(t) is redundantly imposed on each time slot. (Hitoshi Takai, "BER Performance of Anti-Multipath Modulation Scheme PSK-VP and its Optimum Phase-Waveform, *IEEE Trans. VT*, vol 42, No. 4, pp. 625–640, November 1993). That is, a convex phase transition φ(t) is imposed on a DPSK (Differently encoded Phase Shift Keying). (For reference, FIG. 2 shows a differential encoding PSK without the imposing). The transmission signal is detected by a differential detector using a delay line with a delay of one time slot (symbol).

The improvement in BER characteristics in the presence of a two-wave multipath having a propagation time difference τ will be described as referring to FIGS. 3 and 4 (a wave arriving earlier is called as a "direct wave" and a wave arriving succeeding to the direct wave is called as a "delayed wave").

FIG. 3 shows the detected output under two-wave multipath in DPSK.

The unfiltered detected output (solid line) in FIG. 3 (*c*) is obtained via the vectorial sum of the direct and delayed waves having the phase waveforms of FIG. 3 (*a*) and (*b*). The detailed detecting method will be described below. The waveform of a final detected output (dotted line) is obtained by filtering the unfiltered detected output. The final filtered detected output is sampled at a timing corresponding to symbol period; its polarity is judged; and it is decoded into binary data (refer to FIGS. 14–16 for further explanation of the decoding process). In a time area where the direct waveform symbol and the corresponding delayed waveform symbol are overlapped with each other (hereunder referred to as an effective area), polarity of the detected output before filtering is always correct.

However, as shown in FIG. 3, when the direct wave and the delayed wave are opposite to each other in phase, an effective output becomes significantly small. Accordingly, amplitude of the unfiltered detected output (solid line) decreases remarkably. After filtering, the adjacent ineffective output having a relatively large amplitude is mixed into the effective output, and the BER characteristics are degraded severely.

Like FIG. 3, FIG. 4 shows the detected output under the two-wave multipath in the case of the conventional digital signal transmission method explained in FIG. 1. Different from FIG. 3, the unfiltered effective output (solid line in FIG. 4 (*c*)) is not constant because of the imposed redundant phase.. It is apparent from a vector diagram in FIG. 4 (*d*) that the direct and delayed waves do not cancel each other except for a part of the effective area. Therefore, some of the detected output from the effective area remains after filtering (dotted line). As a result, the BER characteristics will not be degraded.

According to the conventional digital transmission method, however, a phase discontinuity occurs between time slots (symbols). Therefore, if the signal is band-limited so as to keep a transmission spectrum narrow, the envelop of signals varies, and the BER characteristics tend to be degraded because when passing the transmission signal through a non-linear amplifier, amplitude/phase conversion characteristics of the amplifier causes a phase-distortion.

Besides, if a non-linear amplifier is used, the band-limitation for spectrum compactness is ineffective because the transmission spectrum will be expanded again when the transmission signal passes through the non-linear amplifier. The transmission spectrum could be kept compact by using a highly linear amplifier; however, a highly linear amplifier is expensive, and it is poor in electric-power efficiency.

SUMMARY OF THE INVENTION

Accordingly, it is an object of the present invention to provide a digital data signal transmission method of maintaining superior bit error rate characteristics in the presence of a multipath propagation even when applying a non-linear circuit to a transmission signal, concurrently of keeping a transmission spectrum narrow.

The above object may be fulfilled by a method of generating a digital transmission signal of a binary or M-ary data sequence where M is 2 or greater, each data in the data sequence corresponding to a time slot which includes a first connection part, a center part, and a second connection part, in which the first connection part of a present time slot is a phase transition waveform which is linked to the second connection part of a time slot preceding the present time slot; the center part is a phase transition waveform which excludes a phase discontinuity, which has a varied primary differential coefficient, and which is identical in shape to a phase transition waveform in another center part spaced therefrom by a prescribed number of time slots, and said two phase transition waveforms in the center parts are shifted from each other according to the data; the second connection part of a present time slot is a phase transition waveform which is connected to the first connection part of a time slot succeeding to the present time slot; and a plurality of phase transition waveforms are stored in a waveform memory for each of the parts, said method comprising the steps of reading the phase transition waveforms out of the waveform memory according to the data of a present time slot and the data of a time slot preceding the present time slot, and generating the phase transition waveform in the first connection part of the present time slot which continues on the second connection part of the time slot preceding the present time slot without a discontinuity even at a linking point between the two time slots; reading the phase transition waveform out of the waveform memory according to the data of a present time slot, and generating the phase transition waveform in the center part of the present time slot which continues on the first connection part of the present time slot without a discontinuity even at a linking point between the parts of the present time slot; and reading the phase transition waveforms out of the waveform memory according to the data of a present time slot and the data of a time slot succeeding to the present time slot, and generating the phase transition waveform in the second connection part of the present time slot which continues to the first connection part of the time slot succeeding to the present time slot without a discontinuity even at a linking point between the time slots.

The phase transition waveform in the center part of each time slot may be a phase transition waveform of a concave or convex function.

The concave or concave function may be a secondary function.

The phase transition waveform in each connection part may be a straight or broken line.

The phase transition waveform in each connection part may be a curved line where no discontinuity is included in a primary differential coefficient even at a linking point between the connection part and the corresponding center part.

The prescribed time slot number may be 1, 2 or greater, and the phase transition waveform in every time slot may be identical to each other in shape.

The prescribed time slot number may be 2 or greater, and the phase transition waveforms in the time slots may have a plurality of waveform shapes.

A phase difference at the linking point between the phase transition waveform in the connection part and the phase transition waveform in the center part may be other than 180°.

In this construction, each time slot of a transmission signal does not include any phase discontinuity even at the connection point between time slots; therefore, the effective bit error rate (BER) characteristics can be maintained even under multipath fading. At the same time, a transmission signal is constant enveloped by excluding any phase discontinuity therefrom.

Accordingly, the BER characteristics of a transmission signal are not degraded even when it is filtered by a circuit having a non-linear distortion (or a non-linear amplifier).

The above object may be fulfilled by a digital signal transmission method comprising the steps of generating a plurality of transmission signals by delaying the transmission signals differently, adjusting the delay times each of which was applied to each transmission signal to be within a predetermined range, transmitting the delayed transmission signals from a plurality of antennas into air, wherein due to the adjustment, an arriving delay time difference at a receiver of the transmission signals is shorter than the length of a center part.

In this construction, the difference in averaged electric field strength within a radio coverage is lowered, also the contour of a radio coverage can be controlled on purpose. A plurality of transmission signal waves may arrive from a plurality of antennas; and they may play the same role as multipath. However, the transmission signals employed herein are robust enough against multipath; therefore, the BER characteristics can be improved by path diversity effect.

The above object may be fulfilled by a digital signal transmission device for transmitting a signal which was generated by modulating a carrier wave according to a binary or an M-ary data sequence where M is 2 or greater, comprising a differentially encoding unit for converting the original data sequence into a transmission data sequence where information to be transmitted is present in a difference between two data which are spaced from each other by a prescribed time slots, a waveform generation unit for generating a phase transition waveform in each time slot which corresponds to each data included in the transmission data sequence, the phase transition waveform including a center part and a connection art for linking the center parts in adjacent time slots, in which a phase transition waveform in the center part of a present time slot is generated according to a corresponding data, then a phase transition waveform in the connection part of the present time slot is generated so that it continues on the phase transition waveforms in the center parts of time slots succeeding to and preceding the present time slot without a discontinuity even at a linking point between any two time slots, and a modulation unit for modulating the carrier wave according to a signal which has the phase transition waveform generated by the waveform generation unit.

The waveform generation unit may comprise a readout control unit, a waveform storage unit, and a D/A (Digital/Analog) converter unit, the readout control unit for providing the transmission data which corresponds to a present time slot together with the transmission data each of which corresponds to time slots succeeding to and preceding the present time slot as readout addresses, and controlling a reading of the waveform storage unit according to the readout addresses, the waveform storage unit for storing a digitized phase transition waveform in the center part according to the transmission data which corresponds to the present time slot and storing a digitized phase transition waveform in the connection parts according to the transmission data each of which corresponds to the time slots succeeding to and preceding the present time slot, and outputting the phase transition waveform in the center or connection part according to the readout address supplied from the readout control unit and a Digital/Analog (D/A) converter for converting the digitized phase transition waveform derived from the waveform storage unit into analog.

The waveform storage unit may store a phase transition waveform of a concave or convex function as the phase transition waveform in the center part.

The waveform storage unit may store a phase transition waveform of a secondary function as the concave or convex function.

The waveform storage unit may store a phase transition waveform shown by a straight or broken line as the phase transition waveform in the connection part.

The waveform storage unit may store a phase transition waveform shown by a curved line where no discontinuity is included in a primary differential coefficient even at a linking point between each connection part and the corresponding center part.

The waveform storage unit may store the phase transition waveform in the center part of each time slot which is identical to each other in shape.

The prescribed time slot number in the differential encoding means may be 2 or more, and the phase transition waveforms in the center parts stored in the waveform storage unit may include a plurality of shapes.

The waveform storage unit may store a phase difference at the linking point between the phase transition waveform in the connection part and the phase transition waveform in the center part being other than 180°.

In this construction, each time slot of a transmission signal does not include any phase discontinuity even at the connection point between time slots; therefore, the effective bit error rate (BER) characteristics can be maintained even under multipath fading. At the same time, a transmission signal is constant enveloped by excluding any phase discontinuity therefrom.

Accordingly, even when a transmission signal is filtered by a circuit having a non-linear distortion (or non-linear amplifier), its BER characteristics are not degraded, and the width of a transmission spectrum width is not expanded again. Since a circuit with a non-linear distortion can be employed, a highly accurate linear-amplifier is omitted from the circuit arrangement. Therefore, the circuit arrangement can be implemented at an inexpensive cost.

The above object may be fulfilled by the digital signal transmission device comprising a plurality of antennas for transmitting a transmission signal into air, and a plurality of delay units for delaying each transmission signal from the digital signal transmission device differently, and providing the delayed transmission signal from one of a plurality of antennas into air, and an adjustment unit for adjusting the delay time applied by each delay unit to be within a predetermined range, so that an arriving delay time difference at a receiver of the transmission signals is shorter than the length of a center part.

In this construction, the difference in averaged field strength within a radio coverage is lowered, also the contour of a radio coverage can be controlled on purpose. A plurality of transmission signal waves may arrive from a plurality of antennas; and they may play the same role as multipath. However, the transmission signals employed herein are sufficiently strong against multipath; therefore, the BER characteristics can be improved by path diversity effect.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

Figure 1:
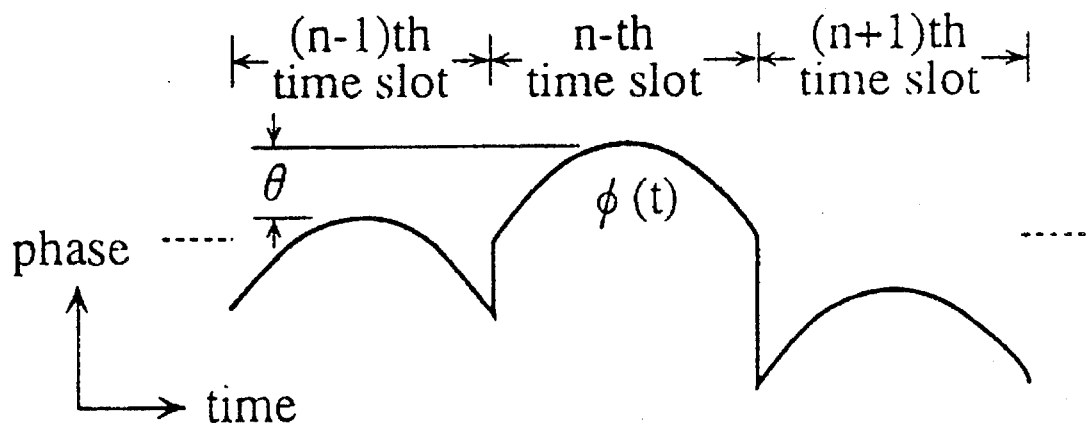
FIG. 1 shows a phase transition waveform of a transmission signal according to the conventional digital signal transmission method.
Figure 2:
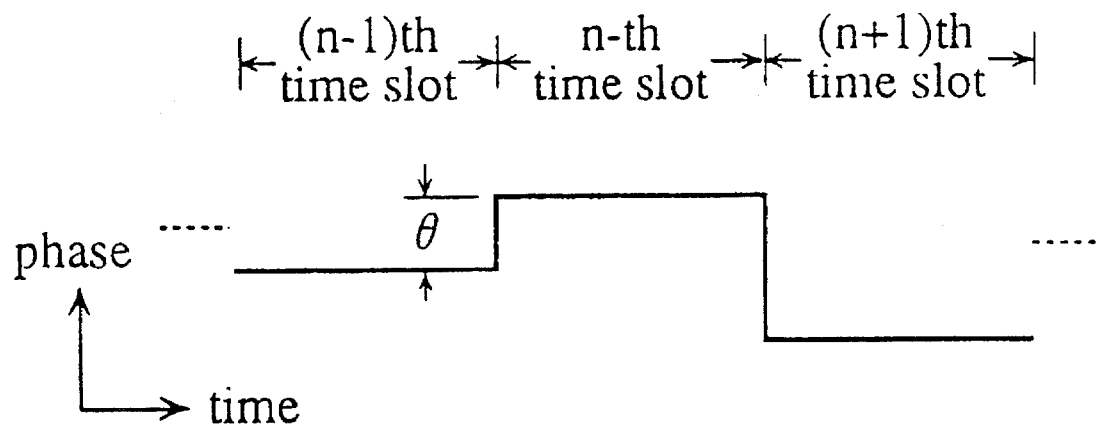
FIG. 2 shows a phase transition waveform of a transmission signal according to the conventional digital signal transmission method.

A digital signal transmission method and a digital signal transmission device, and installation of the digital signal transmission device according to the present invention will be described below as referring to the drawings.

Embodiment 1

Figure 5:
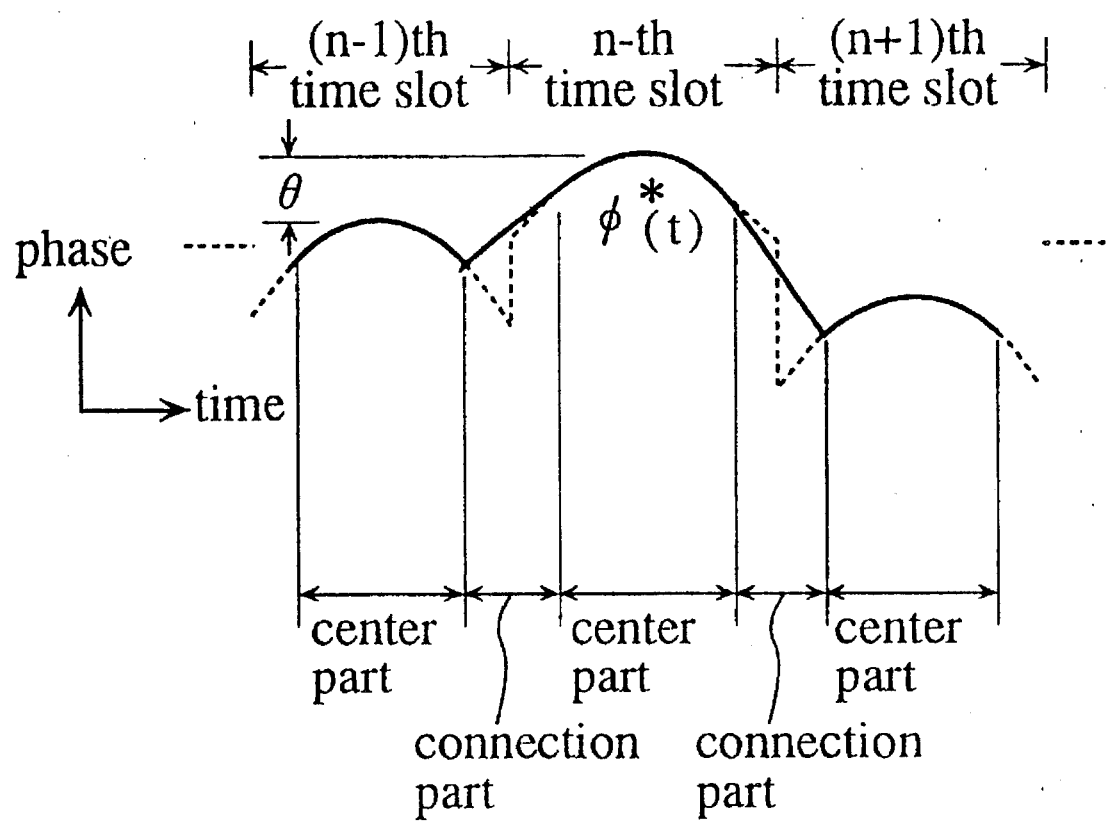
FIG. 5 shows a phase transition waveform of a transmission signal according to a first embodiment of the present invention.

FIG. 5 shows a phase transition waveform of a transmission signal according to a first embodiment of the present invention.

In the figure, x and y axes represent time and phase respectively. The phase transition waveform of a transmission signal has a center part and connection parts, the center part locating at center of a present time slot and the connection parts connecting the center parts of adjacent time slots. To be noted, the phase transition waveform excludes any discontinuity from the center part, connection part, and binding points (For reference, the phase transition waveform according to the conventional digital signal transmission method is shown by the dotted line in the figure. The waveform shown by the dotted line has discontinuities between time slots.)

The phase $\phi^*(t)$ of the transmission signal in the center part is a redundant phase transition; and a primary differential coefficient is required to be variable. For example, a convex or concave function such as a secondary function in FIG. 5 is preferable. By using a convex or concave function, the transmission spectrum width is reduced. Also the degradation in the BER characteristics under the multipath propagation with a large propagation time difference is prevented.

The phase transition waveforms of the center parts in FIG. 5 are identical to each other in shape, and are spaced from each other by one time slot. That is, the center-part phase transition waveforms in a (n−1)th time slot and a n-th time slot which are spaced from each other by one time slot are identical to each other in shape; and they are shifted from each other by θ according to binary or M-ary digital data (e.g., binary, 4-ary, 8-ary) to be transmitted. For preferable example, when a symmetrical binary-phase system with ±π/2 as θ is employed, information of one bit per time slot is transmitted, and when a symmetrical 4-ary phase system with ±π/4, ±3π/4 as θ is employed, information of 2 bit per time slot is transmitted.

A phase waveform of a transmission signal at each connection part, is straight (primary function), and it connects ends of adjacent center parts. The phase waveform at each connection part can be a curved or broken line of any function as long as it excludes any discontinuity. For example, a smooth curve, such as a cubic function whose primary differential coefficient excludes any discontinuity from the connection part, a binding point between the center part and connection part may be employed. Hence, by employing a nonlinear amplifier, it is possible to avoid expanding the transmission spectrum because the transmission signal has a constant envelope.

To be noted, when the waveform at each connection part is straight, it is preferable to rotate the phase in a direction that minimizes the rotation amount, for by doing so the transmission spectrum is not expanded unnecessarily. In view of the transmission spectrum, a symmetrical symbol constellation without 180° as phase difference θ is more desirable than asymmetrical symbol constellation. Besides, there is an uncertainty problem in phase-rotation direction for 180° transition in asymmetrical constellation.

Thus, according to the digital signal transmission method of the present invention, a transmission signal in each time slot is divided into a center part and connection parts. Accordingly, every discontinuity is excluded from the transmission signal, and the transmission signal is modulated as making the envelop be constant (although an amplitude transition can be added on purpose). As a result, the bit error characteristics of the transmission signal are not deteriorated even when it passes through a non-linear distortion circuit; further the transmission spectrum is still kept compact. The improvement mechanism of the BER characteristics will be described later as referring to FIG. 7.

Embodiment 2

(other phase transition waveform)

Figure 6:
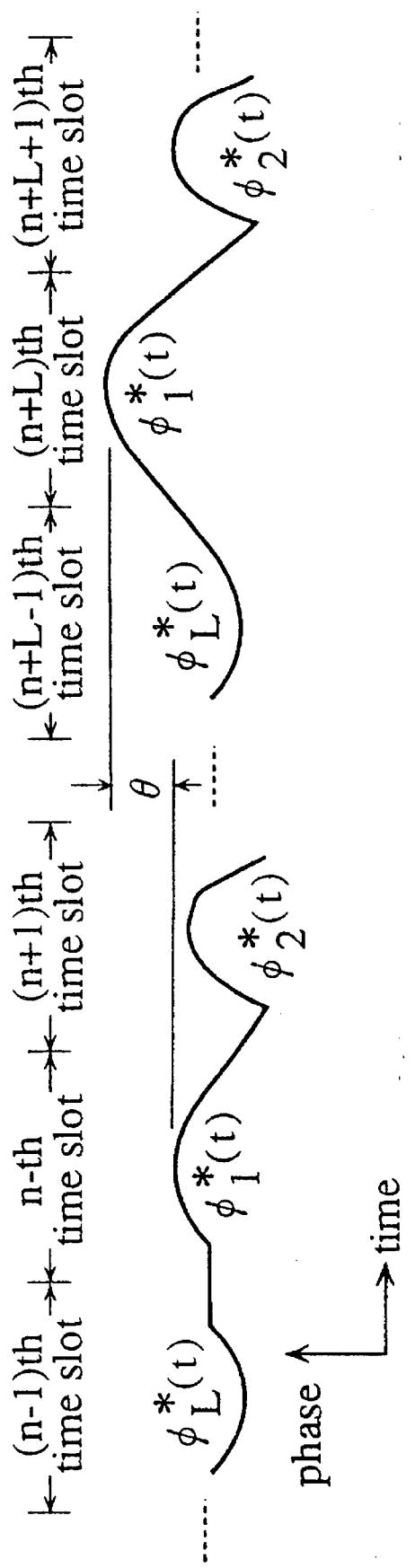
FIG. 6 shows a phase transition waveform of a transmission signal according to a second embodiment of the present invention.

FIG. 6 shows the phase transition waveform according to a digital signal transmission method in a second embodiment of the present invention. The central parts of the phase transition waveforms which are spaced from each other by L time slots, in other words the waveforms in a n-th time slot and a (n+L)th time slot, are identical in shape. The binary or M-ary digital data to be transmitted is present in a phase difference θ between the time slots. The center parts may have at most L sorts of waveforms, φ*i—φ*L. All of them may be identical to each other, or some of them may be identical. By including a plurality of kinds of waveforms, however, the transmission spectrum width can be controlled easily, also anti-multipath characteristics can be improved.

The improvement in the bit error characteristics under multipath fading according to the digital signal transmission method in FIG. 5 will be explained in FIG. 7 by using the same transmission signal in the first embodiment (FIG. 7 (c) and (d) show similar waveforms even when the transmission signal in FIG. 6 is employed; therefore, the following explanation is also applicable to FIG. 6).

Figure 7:
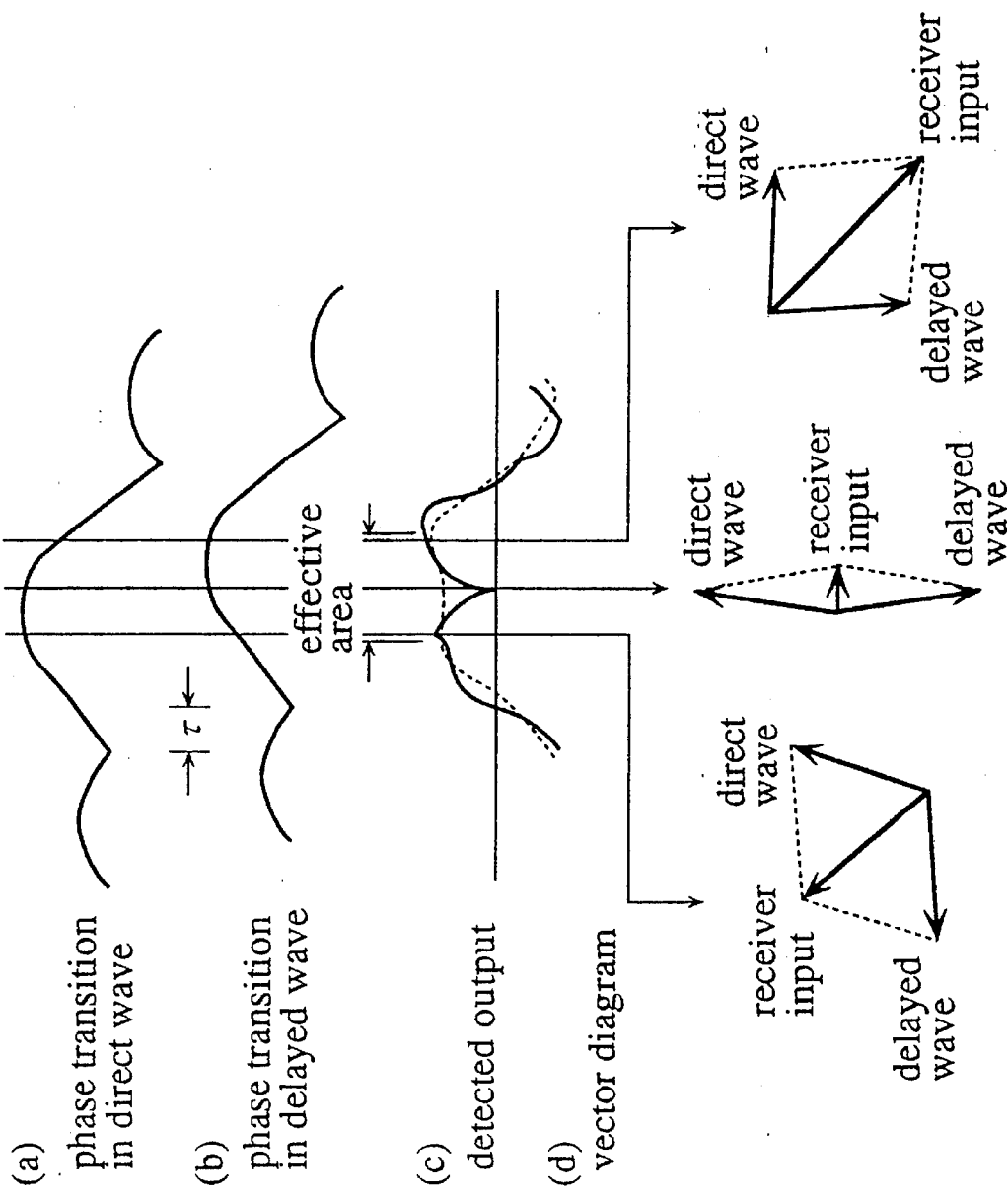
FIG. 7 is a diagram showing improvement of bit error characteristics according to the embodiments of the present invention.

FIG. 7 (a) and (b) show phase transitions of the direct and delayed waves with a propagation delay time difference τ. FIG. 7 (c) shows the detected output under two-wave multipath fading comprising the direct and delayed waves of FIG. 7 (a) and (b). FIG. 7 (d) is a vector diagram showing the direct wave, delayed wave, and the vector sum thereof which correspond to the center and ends of the effective area in FIG. 7 (c).

Figure 3:
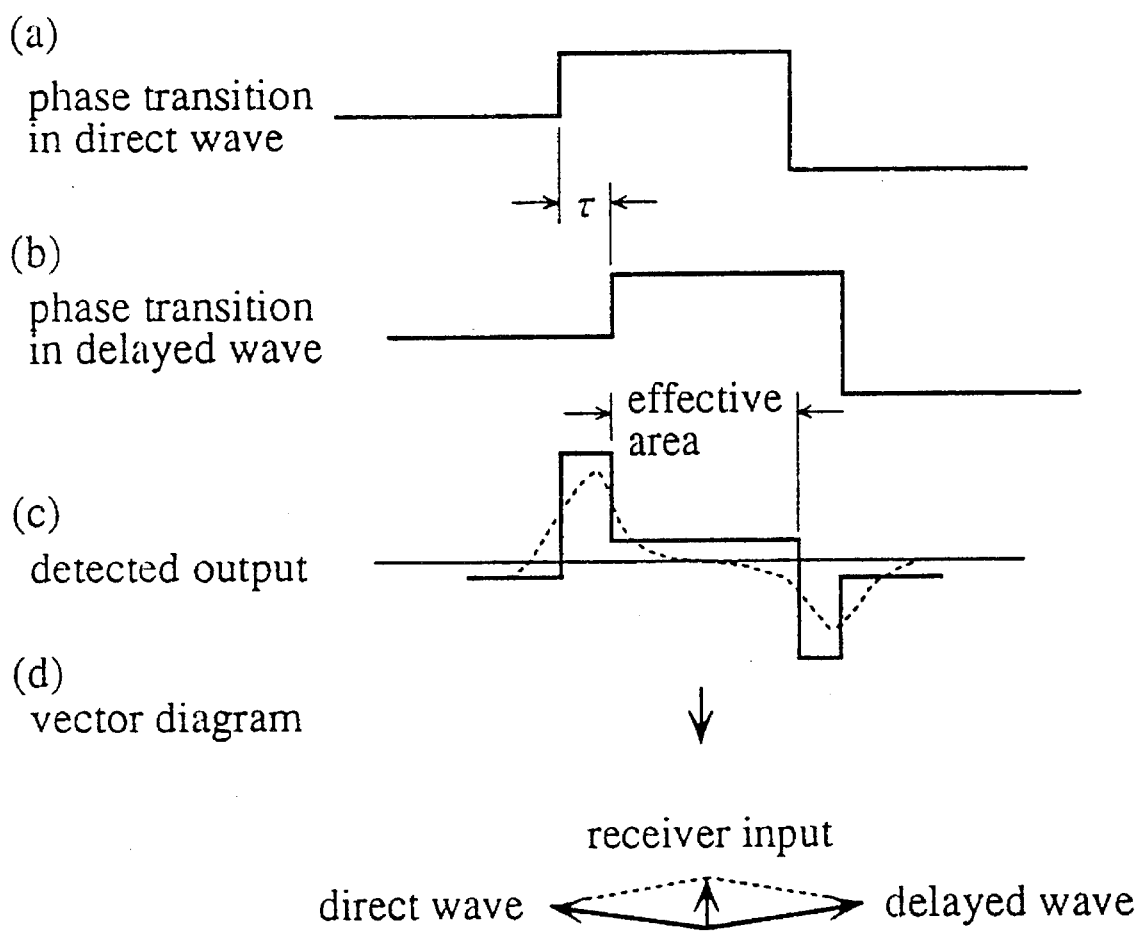
FIG. 3 is a diagram showing degradation of bit error characteristics of the transmission signal in FIG. 2.
Figure 4:
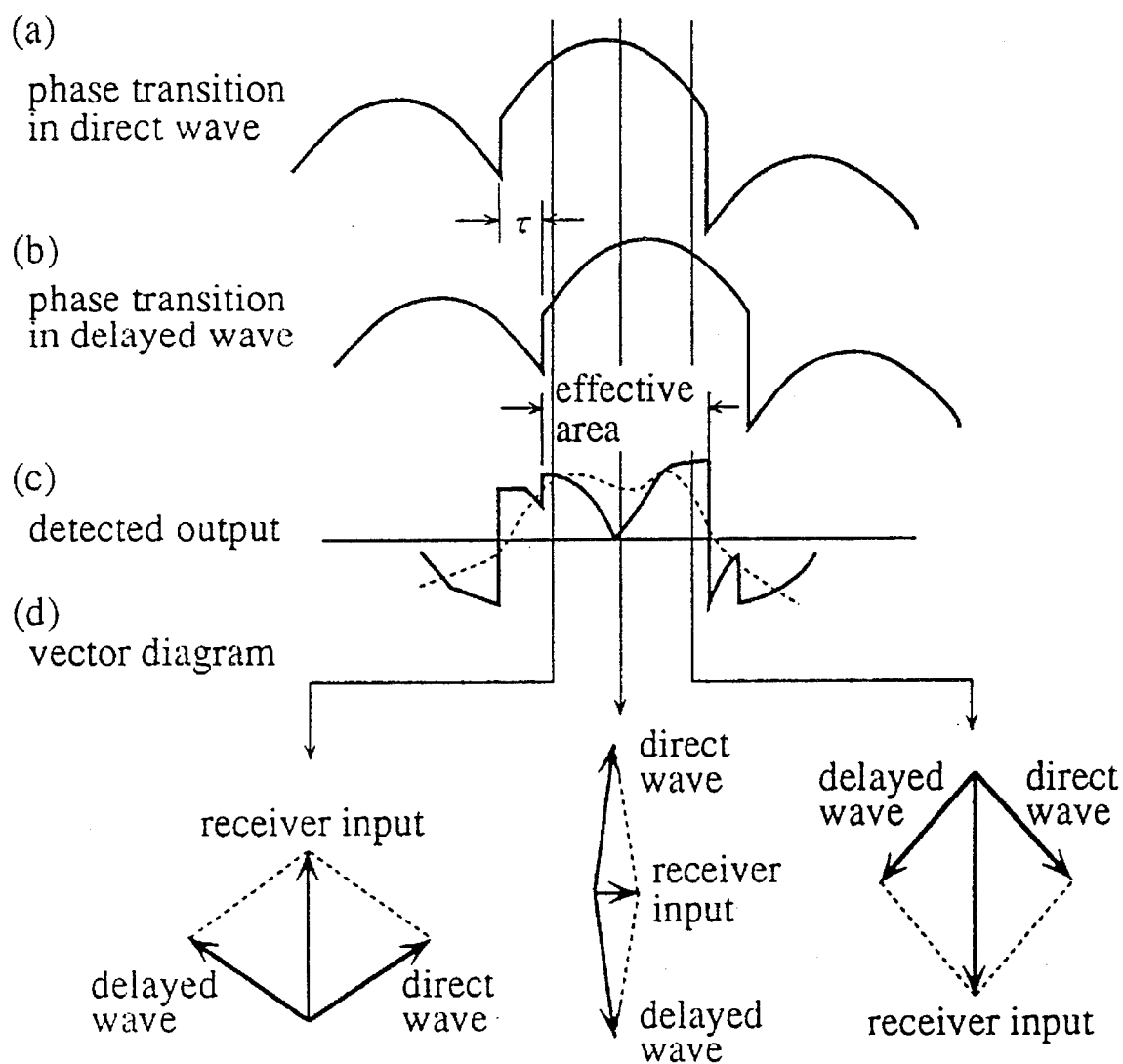
FIG. 4 is a diagram showing improvement of bit error characteristics of the transmission signal in FIG. 1.

The effective area (where polarity of the unfiltered detected output is always correct) is the overlap of the direct and delayed waves in their center parts, and the unfiltered detected output at the effective area (shown by the solid line in FIG. 7 (c)) is not constant because a phase transition waveform φ*(t) was imposed thereto. This is not the same as the conventional DPSK in FIG. 3 but is similar to FIG. 4.

As shown in the vector diagram of FIG. 7 (d), the direct and delayed waves do not cancel each other except for a part of the effective area (around the center of the effective area herein), so that some of the detected output in the effective area will remain. When passing through the filter (dotted line in FIG. 7(c)), the above effective detected output is averaged. Consequently, enough amount of detected output will be attained to prevent the deterioration of the bit error characteristics of the transmission signal. This produces a kind of diversity effect, more specifically a path diversity using multipaths as diversity branches. As a result, the BER characteristics are improved remarkably unless the propagation time difference exceeds the length of the center part (this is required to generate any effective area).

Embodiment 3

(overall construction of device)

Figure 8:
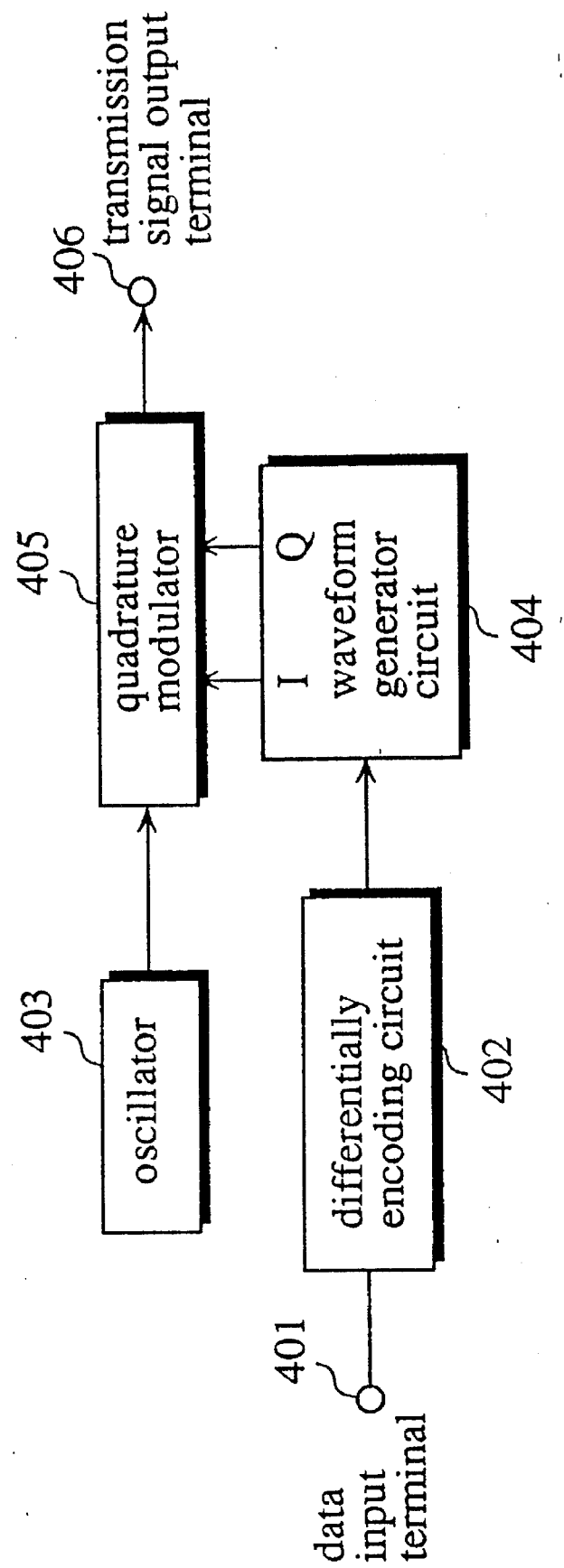
FIG. 8 is a circuit arrangement of a generator circuit according to the digital signal transmission method in the embodiments of the present invention.

FIG. 8 shows the configuration of a digital signal transmission device according to a third embodiment of the present invention. The digital signal transmission device comprises a data input terminal 401, a differentially encoding circuit 402, an oscillator 403, a waveform generator circuit 404, a quadrature modulator 405, and a transmission signal output terminal 406. The digital signal transmission device transmits transmission signals according to the digital signal transmission method in the first and second embodiments.

Digital data is inputted to the data input terminal 401.

The differential encoding circuit 402 differentially encodes the digital data supplied from the data input terminal 401.

The oscillator 403 generates a carrier wave and provides it to the quadrature modulator 405.

The waveform generator circuit 404 generates modulating baseband signals in I- and Q-phases according to the differentially encoded data.

The quadrature modulator 405 modulates the carrier wave with the modulating signals in the I- and Q-phases from the waveform generator circuit 404, and outputs a modulated signal.

The transmission signal output terminal 406 outputs the modulated signal from the quadrature modulator 405.

(quadrature modulator)

Figure 9:
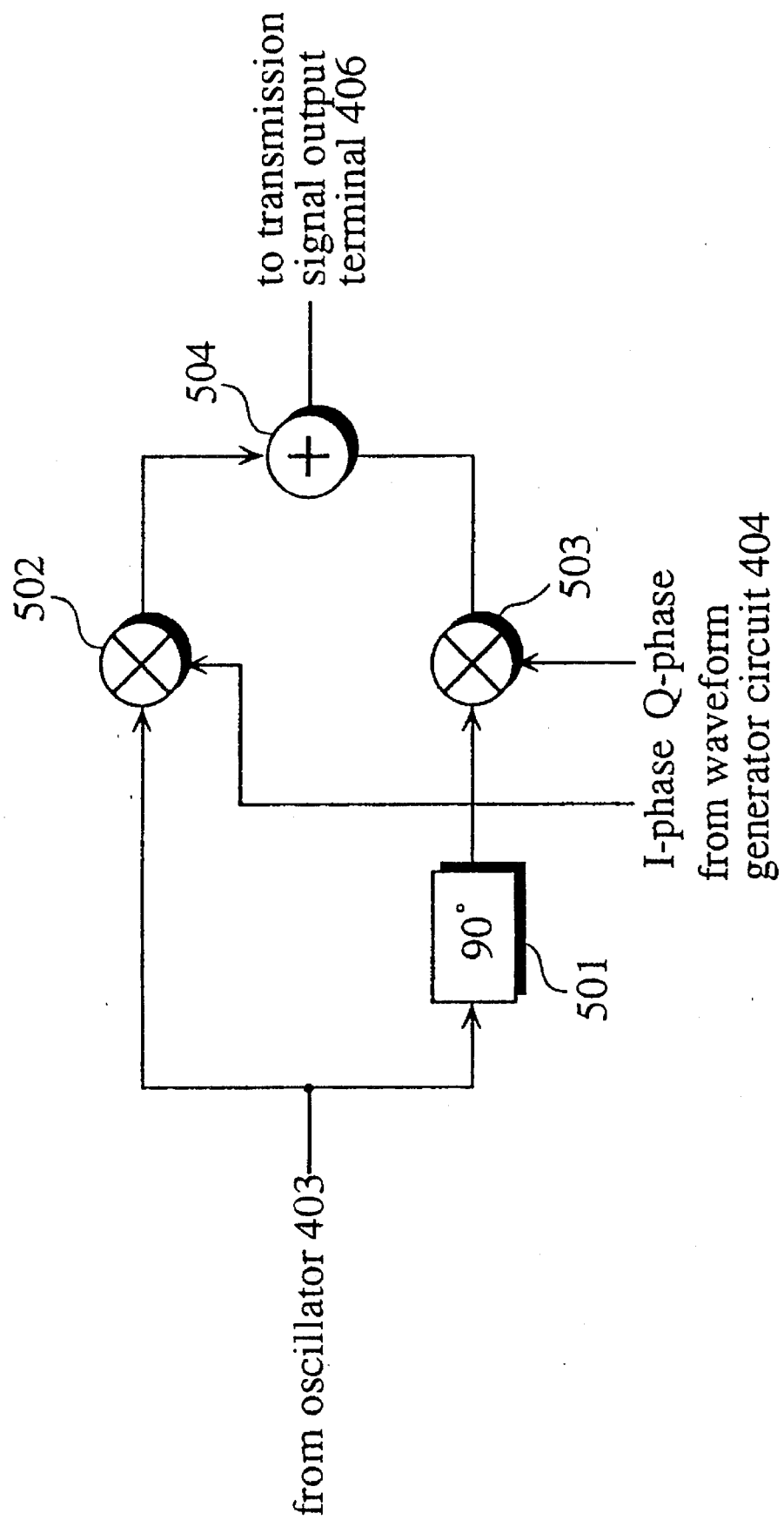
FIG. 9 is an exemplary circuit arrangement of a quadrature modulator 405 in FIG. 8.

FIG. 9 shows an exemplary circuit arrangement of the quadrature modulator 405 in FIG. 8. The quadrature modulator comprises a 90° phase shifter 501, balanced modulators 502 and 503, and a combiner 504.

The 90° phase shifter 501 phase-shifts the carrier wave from the oscillator 403 by 90°.

The balanced modulator 502 modulates the carrier wave into an I-phase modulated signal.

The balanced modulator 503 modulates the carrier wave phase-shifted by 90° into a Q-phase modulated signal.

The combiner 504 combines the I- and Q-phase modulated signals into a modulated transmission signal.

(differentially encoding circuit)

Figure 10:
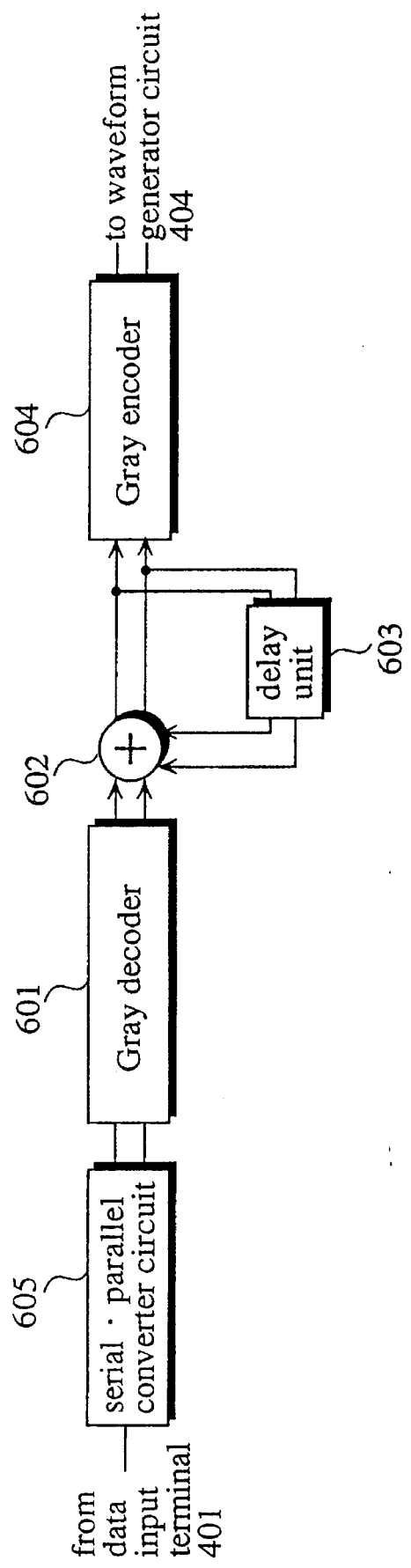
FIG. 10 is an exemplary circuit arrangement of a differential encoding circuit 402 in FIG. 8.

FIG. 10 is an exemplary circuit arrangement of the differentially encoding circuit 402 in FIG. 8. The differentially encoding circuit 402 comprises a Gray decoder 601, a binary adder 602, a delay unit 603, a Gray encoder 604, and a serial-parallel converter circuit 605.

The Gray decoder 601 converts a parallel data from the serial-parallel converter circuit 605 into an intermediate code. In particular and only when a 2-bit parallel data (4 phases) is applied thereto, the Gray decoder 601 operates equally to the Gray encoder 604, and the intermediate code is identical to the Gray code.

The binary adder 602 adds the output of the Gray decoder 601 to the output of the delay unit 603.

The delay unit 603 delays the output of the binary adder for L time slots.

The Gray encoder 604 converts the output of the binary adder 602 into a Gray code.

The serial-parallel converter circuit 604 converts a serial data inputted from the data input terminal 401 in FIG. 8 into a parallel data.

(waveform generator circuit)

Figure 11:
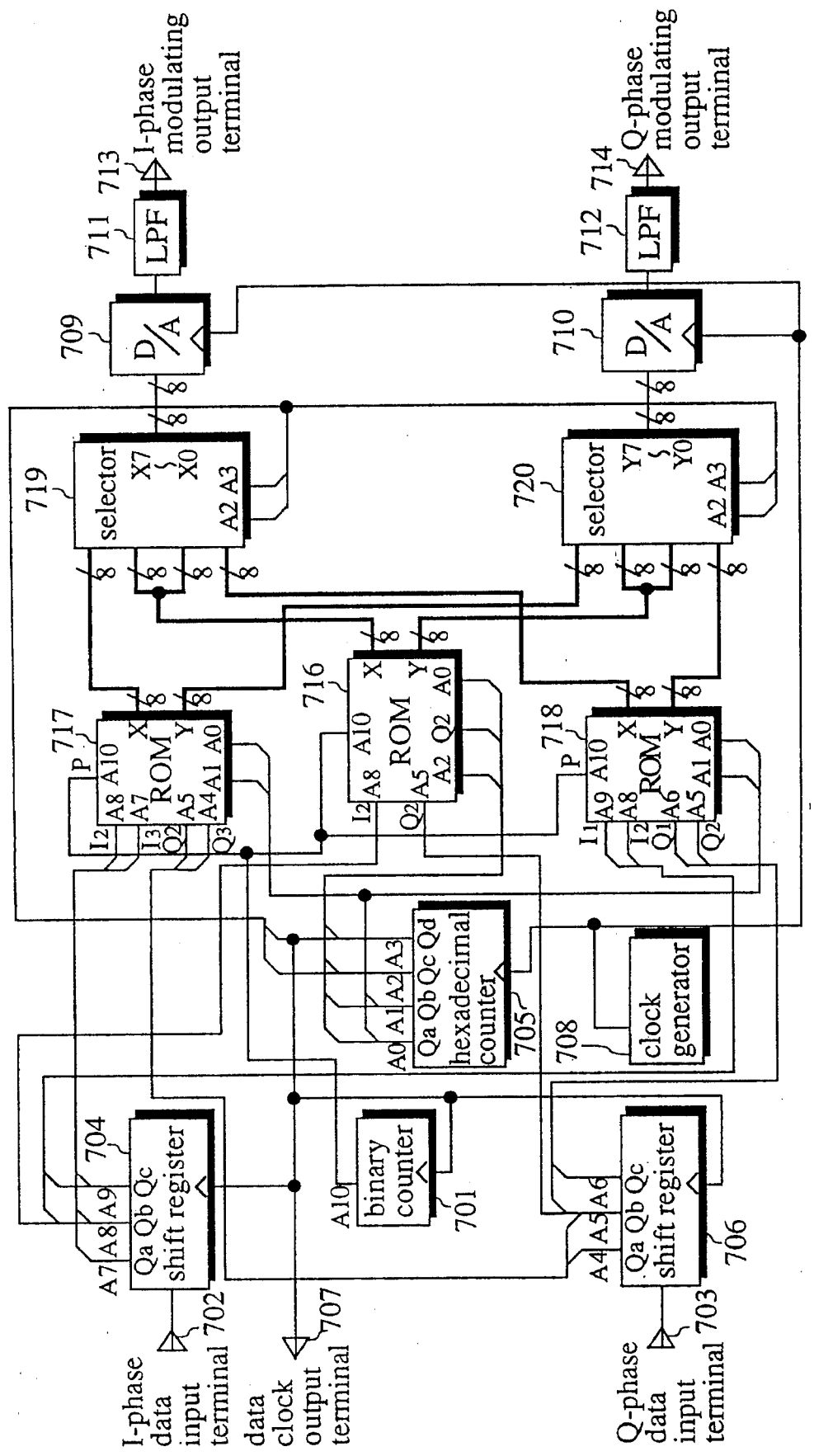
FIG. 11 is an exemplary circuit arrangement of a waveform generator circuit 404 in FIG. 8.

FIG. 11 shows an exemplary circuit arrangement of the waveform generator circuit 404 in FIG. 8 with respect to a quadrature-phase system. The waveform generator circuit 404 comprises a binary counter 701, an I-phase data input terminal 702, a Q-phase data input terminal 703, shift registers 704 and 706, a hexadecimal counter 705, a data clock output terminal 707, a clock generator 708, D/A converters 709 and 710, low-pass filters..711 and 712, an I-phase modulating output terminal 713, a Q-phase modulating output terminal 714, ROMs (Read Only Memory) 716–718, and selectors 719 and 720.

A clock of one time slot is inputted to the binary counter 701. The output of the binary counter 701 indicates if the time slot number is even or odd, and it is inputted to address A10 of the ROMs 716–718. Accordingly, different waveforms can be generated in odd number time slots and even number time slots from each other.

The I- and Q-phase data from the Gray encoder 604 in FIG. 10 is inputted to the I-phase data input terminal 702 and Q-phase data input terminal 703, respectively.

The shift registers 704 and 706 shift the data from the data input terminals 702 and 703 by one time slot, and outputs I- and Q-phase data in the present time slot and modulating data in time slots subsequent to and preceding the present time slot to lower and upper addresses of the ROMs, respectively.

Stated concretely, the shift register 704 shifts the data supplied from the I-phase data input terminal 702 by one time slot, and outputs the I-phase data in the present time slot (I2) to the ROM 716, the I-phase data in the present time slot (I2) and the I-phase data in time slot preceding the present time slot (I1) to the ROM 718, and the I-phase data in the present time slot (I2) and the I-phase data in time slot subsequent to the present time slot (I3) to the ROM 717.

The shift register 706 shifts the data from the Q-phase data input terminal 703 by one time slot, and outputs the Q-phase data in the present time slot (Q2) to the ROM 716, the Q-phase date in the present time slot (Q2) and the Q-phase data in time slot preceding the present time slot (Q1) to the ROM 718, and the Q-phase data in the present time slot (Q2) and the Q-phase data in time slot subsequent to the present time slot (Q3) to the ROM 717.

The hexadecimal counter 705 counts 16 times during one time slot clock, and outputs 4-bit data Qd–Qa which indicates each counting number to lower addresses of the ROM 716–718. Each time slot is composed of 16 sampling points; four sampling points for the ROM 718, 8 sampling points for the ROM 716, and four sampling points for the ROM 717.

The data clock output terminal 707 outputs a clock whose cycle is equal to one time slot (data symbol clock) to data source. The hexadecimal counter 705 frequency divides a reference clock signal Generated by the clock Generator 708 into sixteen data clocks, and provides the data clocks to the binary counter 701, the shift registers 704 and 706 of the waveform Generator circuit 708.

The clock Generator 708 Generates a clock whose period is 1/16 of the data clock, and provide it to the hexadecimal counter 705, D/A converters 709 and 710.

The D/A (Digital/Analog) converter 709 converts digital signals derived from the ROM 716–718 via the selector 719 into analog signals.

The D/A (Digital/Analog) converter 710 converts digital singles derived from the ROM 716–718 via the selector 720 into analog signals.

The low-pass filters 711 and 712 remove high-frequency components to avoid an aliasing distortion.

The I-phase modulating output terminal 713 and Q-phase modulating output terminal 714 output the I- and Q-phase analog waveforms which has passed through the low-pass filters 711 and 712, respectively.

Figure 12:
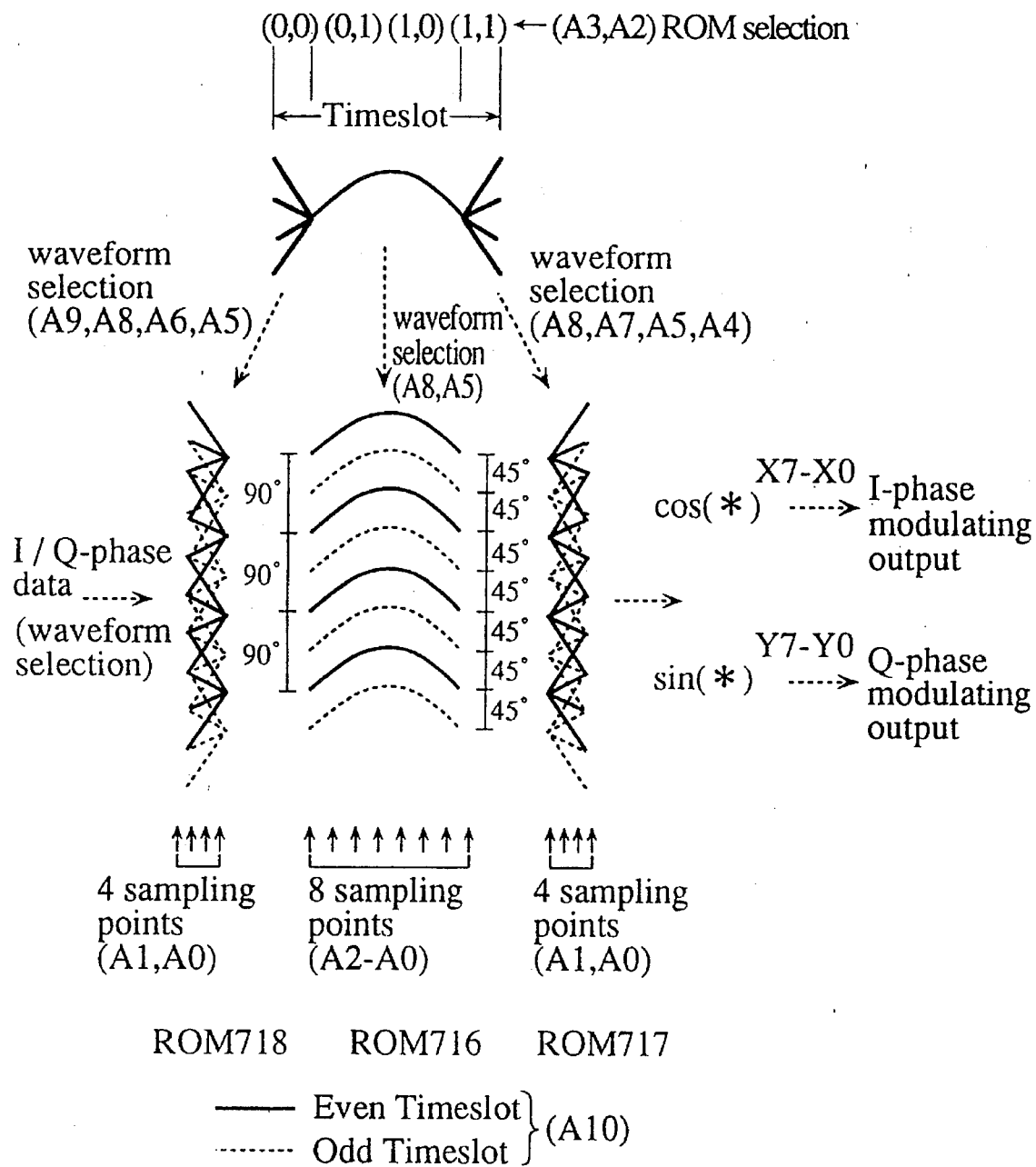
FIG. 12 shows waveforms stored in each of ROMs 716–718.

A baseband waveform in one symbol (in one time slot) is pre-written into the ROMs 716–718. As shown in FIG. 5, one symbol composes the center part of the present time slot, and the connection parts of time slots preceding and subsequent to the present time slot; and each of them is stored in one of the ROMs 716–718. FIG. 12 is illustrative of waveforms stored in the ROMs 716–718.

For center parts of time slots, four phase waveforms in even number time slots (solid lines) and four phase waveforms in odd number time slots (dotted lines) are stored in the ROM 716 in FIG. 12. One of the waveforms is selected according to values of address lines A10, A8, and A5. The address line A10 indicates whether the present time slot number is even or odd; and the address lines A8 and A5 show values of the I-phase and Q-phase data respectively. Each waveform is composed of 8 sampling points and they are designated in order by address lines A2–A0.

Actually, the ROM 716 stores I- and Q-phase modulating waveforms separately, although they are not separated in FIG. 12 for convenience of the explanation. The I-phase modulating waveforms are obtained by calculating the sin while the Q-phase modulating waveforms are obtained by calculating the cosine. Waveform data which is read out from each of the eight sampling points is outputted as an 8 bit data, X7–X0 and Y7–Y0 for I-phase and Q-phase, respectively.

For connection parts of time slots preceding the present time slots, sixteen phase waveforms in even number time slots (solid lines) and sixteen phase waveforms in odd number time slots (dotted lines) are stored in the ROM 718. One of the waveforms is selected according to values of address lines A10, A9, A6, A8 and A5. The address lines A9 and A6 show values of the I- and Q-phase data in time slot preceding the present time slot respectively, and the address lines A8 and A5 indicate values of the I-and Q-phase data in the present time slot respectively. Therefore, it is possible to select the waveforms for the connection part so as to exclude any discontinuity between symbols. Each waveform is composed of 4 sampling points and they are designated in order by address lines A1–A0. Substantially same as the ROM 716, I- and Q-phase modulating waveforms are stored in the ROM 718 separately, and the description will not be repeated.

The ROM 717 stores substantially same as the ROM 718 except for storing waveforms in connection positions of time slots succeeding to the present time slots, and the description will not be repeated.

According to values of address lines A3 and A2, the selector 719 selects one of the ROMs 716-718 for readout of I-phase modulating waveform; accordingly, the ROM 718 is selected for time slot preceding the present time slot; the ROM 716 is selected for the present time slot; and the ROM 717 is selected for time slot succeeding to the present time slot. Thus, the combination of the address lines A3 and A2 indicate two connection parts and center part, and the selective operation is conducted according to them. Repeating this selective operation enables the selector 719 to output I-phase waveforms continuously.

The selector 720 operates the same as the selector 719 except for selecting the source for Q-phase waveforms, and the description will not be repeated.

(description of operation)

Operation of the digital signal transmission device according to the embodiment of the present invention will be described below.

(operation of differentially encoding circuit)

In FIG. 8, digital transmission data is inputted to the data input terminal 401, and differentially encoded by the differentially encoding circuit 402, which will be described below as referring to FIG. 10.

The binary transmission data sequence from the data input terminal 401 is converted into parallel data by the serial-parallel converter circuit 605. More specifically, when the multiphase number (M-ary transmission) is M (M= 2,4,8...), the input data is converted into a p bit parallel data sequence ($2^P$=M).

The four-phase system (p=2) is employed in FIG. 10, for example, so that a two-bit parallel data sequence is outputted from the serial-parallel converter circuit 605. Also, for improvement in the BER characteristics, a Gray code constellation is used.

The p bit parallel data sequence is converted into an intermediate code by the Gray decoder 601 [when 2-bit parallel data (four-phase system) is applied, the Gray decoder 601 is equivalent to the Gray encoder 604. Therefore, the intermediate code becomes a Gray code.]The intermediate code is applied to the binary adder 602 in which it is added to data which has been produced by delaying the output of the adder 602 by the delay unit 603 for L time slots/symbol. Therefore, the information to be transmitted is present in a 0 phase difference between the phase waveforms which are spaced apart from each other by L time slots/symbol (See FIG. 6). Subsequently, the Gray encoder 604 converts the output of the binary adder 602 into a Gray code.

(operation of waveform Generator circuit)

The waveform Generator circuit 404 in FIG. 8 Generates I- and Q-phase modulating waveforms according to the differentially encoding data from the differentially encoding circuit 402, which will be described in detail as referring to FIG. 11.

The output of the differentially encoding circuit 402 is a 2-bit parallel data sequence. Each of the bit sequences is synchronized with the data clock to be inputted from the I-phase data input terminal 702 and the Q-phase data input terminal 703. Synchronized with the data clock, each of the inputted data sequences is delayed by the shift registers 704 and 706; accordingly, three modulating data including data in the present time slot, and in time slots preceding and succeeding to the present time slot are outputted. The modulating data in the present time slot is outputted from an output terminal Qb; the modulating data in time slot preceding the present time slot is outputted from an output terminal Qc; and the modulating data in time slot subsequent to the present time slot is outputted from an output terminal Qa of the shift registers 704 and 706

The Addresses A9–A4 of the ROMs 716–718 are used in the selection of waveforms for determining which modulating data is to be selected, and the 6-bit output of the shift registers 704 and 706 are written thereat (See FIG. 12). Besides the addresses A8 and A5 for the modulating data in the present time slot, the addresses A9 and A6 for the modulating data in time slot preceding the present time slot are stored in the ROM 718; accordingly, it is possible to select modulating data so as to exclude any discontinuity from the connection part between the present time slot and preceding the same. Also the addresses A7 and A4 for the modulating data in time slot subsequent to the present time slot are stored in the ROM 717 besides A8 and A5; accordingly, it is possible to select modulating data so as to exclude any discontinuity from the connection position between the present time slot and succeeding thereto.

Further, the address A10 attained by the binary counter 701 for detecting odd/even number of time slot is inputted to the ROM 716–718. Thus, the output Qa (address A 10) of the binary counter 701 is used to define the present time slot as odd/even number time slot. By using a symmetric symbol constellation where an odd or even number time slot is displaced 45° with respect to the other time slot, uncertainly of phase shift direction can be resolved. A 4-bit output which is produced by frequency dividing a reference clock signal from the clock generator 708 is inputted as a modulating waveform readout signal to the addresses A2 through A0 of the ROM 716 and the addresses A1 through A0 of the ROMs 717 and 718. During one data symbol clock period, 0 through 15 are counted at these lower addresses to read out one modulating waveform. According to FIG. 12, one modulating waveform is composed of 16 sampling points, 4 at each of the connection parts and 8 at the center part. Accordingly, the sampled data read from the ROMs 717, 716, 718 is outputted as an 8-bit I- or Q-phase data. The selector 719 and 720 operate to output the I-and Q-phase modulating waveforms (X7–X0, Y7–Y0) in which the center and connection parts are combined without a discontinuity.

The baseband waveforms from the selectors 719 and 720 are converted into analog signals by the D/A converters 709 and 710; aliasing components are removed by the low-pass filters 711 and 712; and the analog signals are outputted from the I- and Q-phase modulating output terminals 713 and 714 respectively as I- and Q-phase modulating signals.

The outputs of the I- and Q-phase modulating output terminals 713 and 714 are modulated by the quadrature modulator 405 in FIG. 9.

The carrier wave provided by the oscillator 403 is modulated into an I-phase modulated signal according to the I-phase modulating signal from the waveform generator circuit 404 by the balanced modulator 502. The carrier wave is phase-shifted by 90°, and it is modulated into a Q-phase modulated signal according to the Q-phase modulating signal from the waveform generator circuit 404 by the balanced modulator 503.

The I- and Q-phase modulated signals are combined into a modulated transmission signal by the combiner 504, and is outputted from the transmission signal output terminal 406.
(another circuit arrangement of waveform generator circuit)

Figure 13:
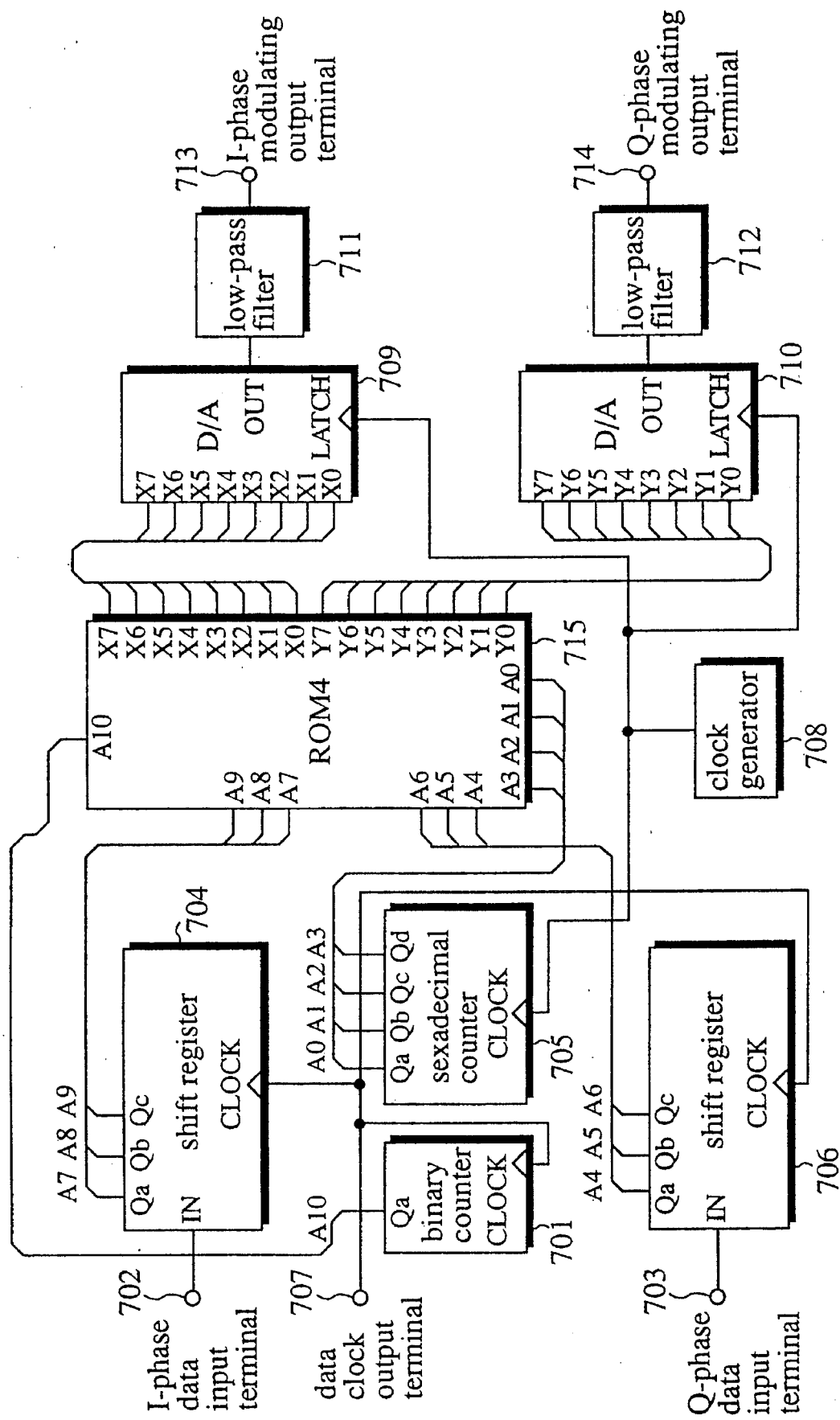
FIG. 13 is another circuit arrangement of the waveform generator circuit 404 in FIG. 11.

FIG. 13 shows another circuit arrangement of the waveform generator circuit in FIG. 11.

Denoted in FIG. 11 and FIG. 13 at 701–714 are identical to each other, therefore the description will not be repeated. Different from FIG. 11, a ROM 715 replaces the ROMs 716–718 and the selectors 719 and 720.

A baseband waveform in one symbol (time slot) is pre-written in the ROM 715, including connection parts and a center part (FIG. 5). Stated otherwise, a combination of waveforms in the center part and waveforms in the connection parts, which is shown in FIG. 12, are written in the ROM 715. A highest address A10 designates whether the present time slot is even number or odd number; each of higher addresses A9-A7, A6-A4 represent I- and Q-phase data in the present time slot and time slots succeeding to and preceding the present time slot; and lower addresses A3–A0 indicates sampling points of the waveform in one time slot. A modulating baseband waveform will be attained by combining these outputs.

Thus, the ROM 715 in FIG. 13 is equivalent to the ROMs 716-718 and selectors 719 and 720; therefore, the circuit arrangement in FIG. 13 includes less components, and is Simpler than FIG. 11. FIG. 13 is more advantageous than FIG. 11 with respect to the circuit arrangement.

However, each of the ROMs 717 and 718 stores 32 I-phase waveforms and 32 Q-phase waveforms respectively; and the ROM 716 stores 8 I-phase waveforms and Q-phase waveforms. Thus, 144 waveforms are stored in the three ROMs in FIG. 11. In contrast, the ROM 715 in FIG. 13 stores 256 waveforms, including 128 I-phase waveforms and 128 Q-phase waveforms. Therefore, the ROM in FIG. 13 requires a larger memory capacity than the ROMs in FIG. 11, and the circuit arrangement in FIG. 13 generates waveforms more easily than FIG. 11. Thus, the choice of FIG. 11 and FIG. 13 is the memory capacity and a trade off of configuration complexity.

(wave detection.demodulating)

Detection/demodulating of a transmission signal according to the digital signal transmission method of the present invention will be described. In general, a signal is detected by a conventional differential detector having a delay line for L time slots. In the second embodiment, the delay line delays an input signal by L time slots (symbols). The detecting method will be described briefly hereinbelow.

Figure 14:
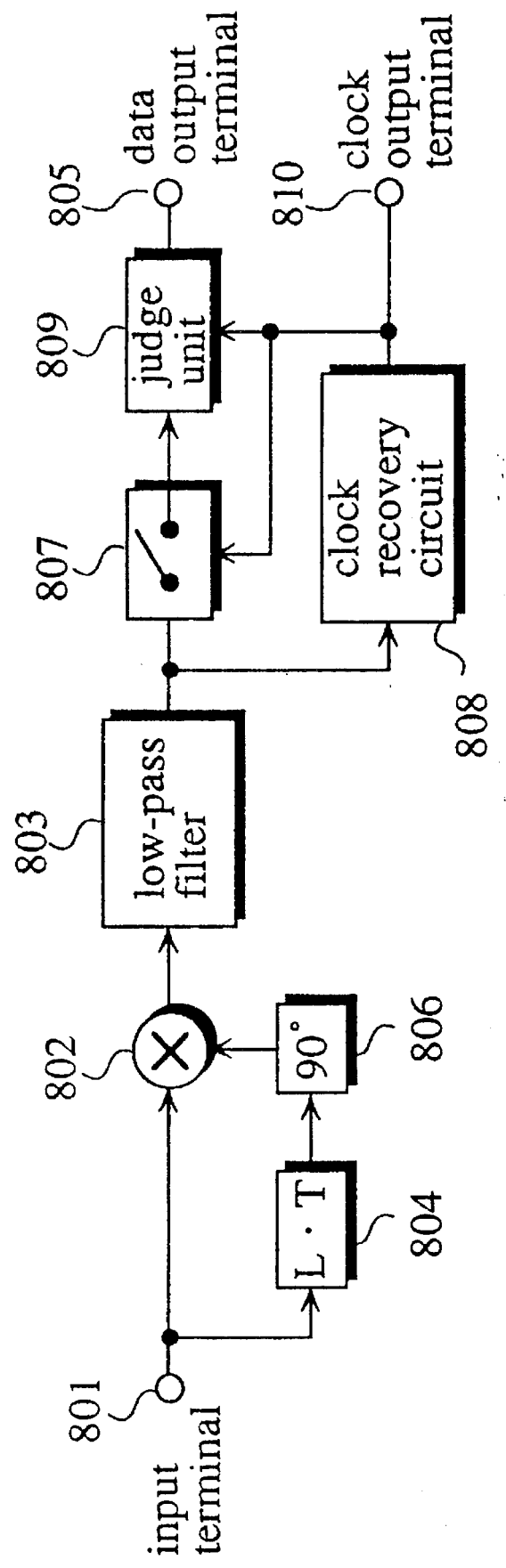
FIG. 14 is a circuit arrangement of a detector circuit according to the digital signal transmission method in one of the embodiments of the present invention.

FIG. 14 shows a circuit arrangement of a differential detector/demodulator of a binary-phase system. The differential detector/demodulator in the figure comprises an input terminal 801, a multiplier 802, a low-pass filter 803, a delay unit 804, an output terminal 805, a 90° phase-shifter 806, a sampler 807, a clock demodulator circuit 808, a judge unit 809, and a clock output terminal 810.

The input signal is delayed for the L time slots (symbols) by the delay unit 804; then it is phase-shifted by the 90° phase-shifter 806. Subsequently, the delayed signal is multiplied by the original input signal. High frequency components are removed from the output of the multiplier 802 by the low-pass filter 803. The clock recovery circuit 808 extracts a clock timing, and re-generates a recovered symbol clock. The symbol clock paces the sampler 807 to sample the filtered detected signals at an appropriate timing. The judge unit 809 judges polarities of the sampled results to demodulate a binary data sequence, and outputs it from the data output terminal.

Figure 15:
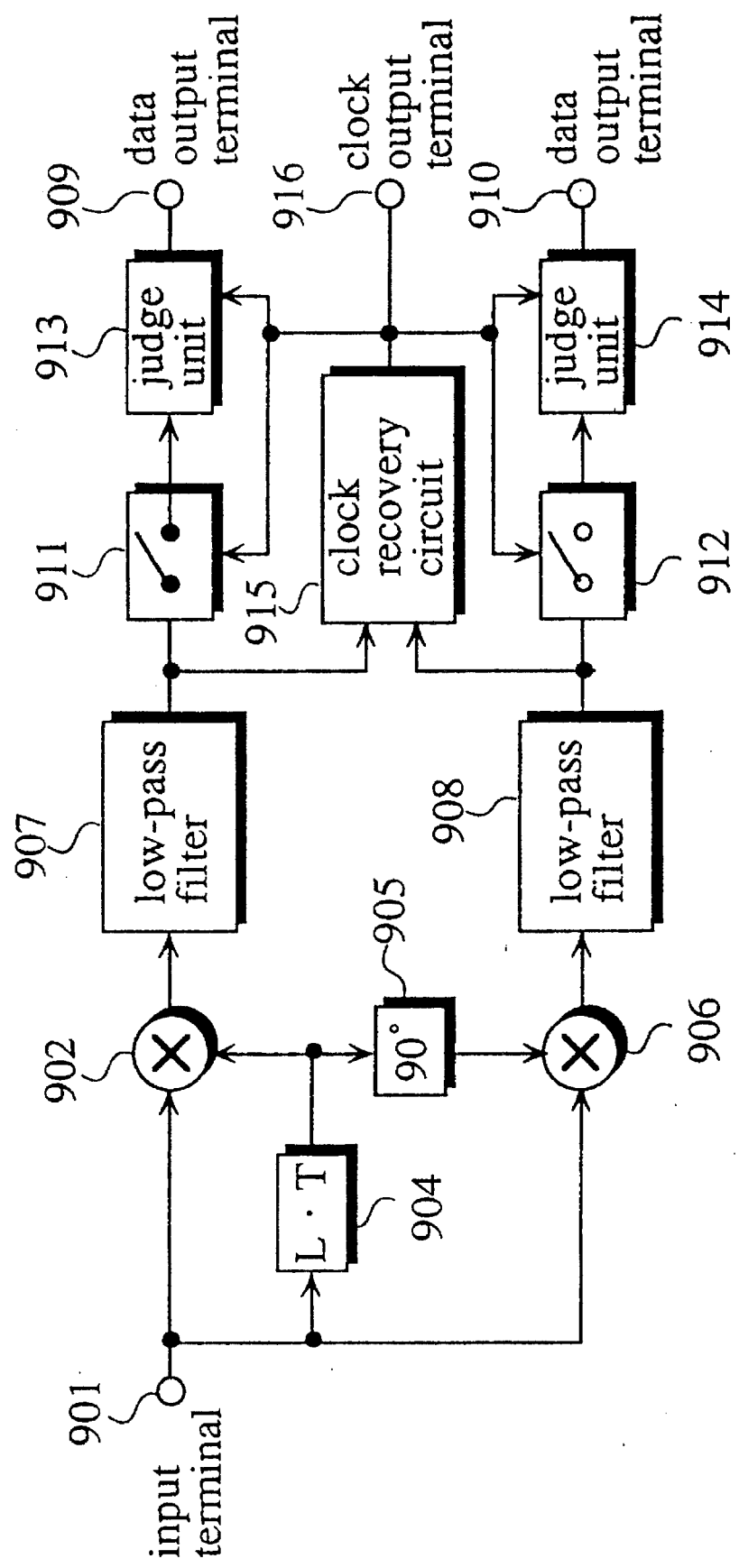
FIG. 15 is a circuit arrangement of a detector circuit according to the digital signal transmission method in one of the embodiments of the present invention.

FIG. 15 shows a circuit arrangement of a differential detector/demodulator of a quadrature-phase (4-ary) system. The differential detector/demodulator in the figure comprises an input terminal 901, multipliers 902 and 906, a delay unit 904, a 90° phase-shifter 905, low-pass filters 907 and 908, output terminals 909 and 910, samplers 911 and 912, judge units 913 and 914, a clock recovery circuit 915, and a clock output terminal 916.

The detecting method is fundamentally the same as that of the binary-phase system in FIG. 15 except that phase shifter 905 serves to effect differential detection with respect to two mutually perpendicular axes which are 90° displaced for demodulating 2-bit parallel data sequences. The 2-bit parallel data sequences are then outputted from the output terminals 909 and 910. Further, if necessary, the 2-bit parallel data sequences are converted into a serial binary data sequence by the parallel-serial converter.

Figure 16:
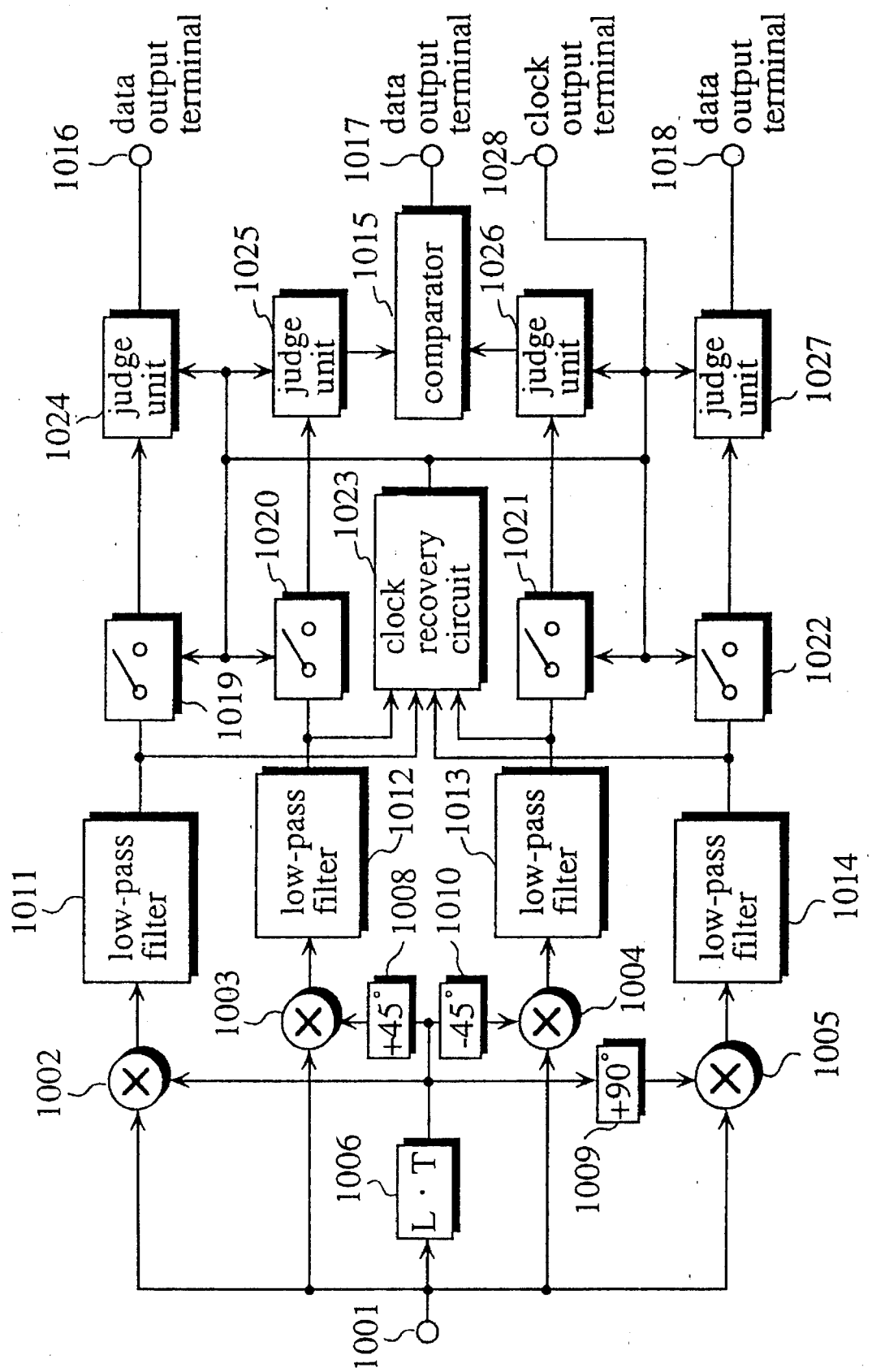
FIG. 16 is a circuit arrangement of a detector circuit according to the digital signal transmission method in one of the embodiments of the present invention.

FIG. 16 shows a circuit arrangement of a differential detector of a an octal-phase (8-ary) system. The differential detector in the figure comprises an input terminal 1001, multipliers 1002–1005, delay unit 1006, +45° phase shifter 1008, a +90° phase shifter 1009, –45° phase shifter 1010, low-pass filters 1011–1014, a comparator 1015, output terminals 1016–1018, samplers 1019–1022, a clock recovery circuit 1023, judge units 1024–1027, and a clock output terminal 1028.

The detecting method is fundamentally the same as that of the binary-phase system in FIG. 14 or 15 except that the phase-shifters 1008–1010 serve to effect differential detection with respect to four axes which are 45° displaced for demodulating 3-bit parallel data sequences. For detecting, the comparator 1015 decides if two output of the four axes are of the same polarity or not. The 3-bit parallel data sequences are outputted from the output terminals 1016, 1017 and 1018. Also, if necessary, the 3-bit parallel data sequences are converted into a serial binary data sequence by the parallel-serial converter.

Embodiment 4

Figure 17:
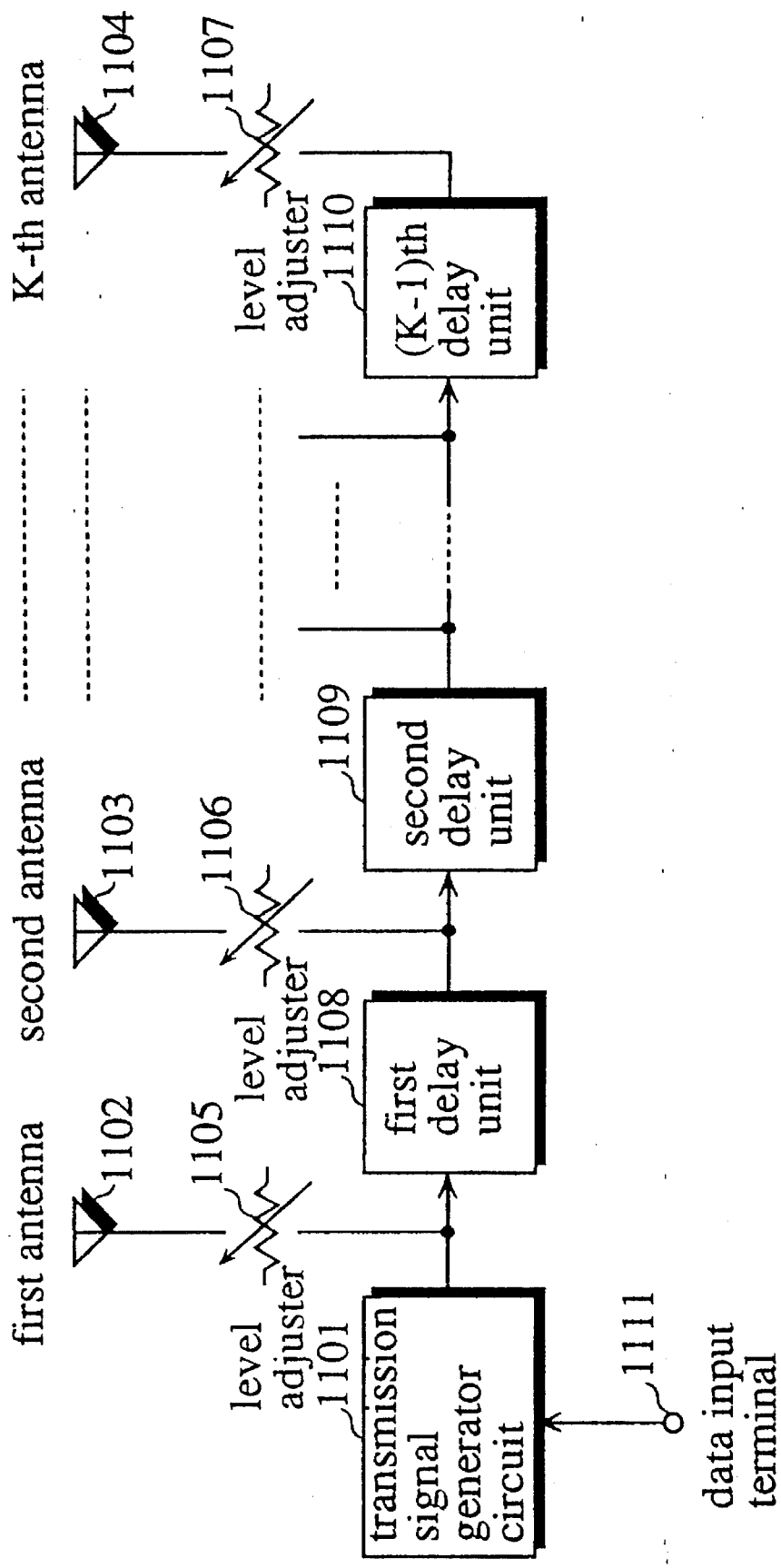
FIG. 17 shows the configuration of a transmission device according to a digital signal transmission method in fourth embodiment of the present invention.

FIG. 17 shows the circuit arrangement of a transmitter circuit according to a digital signal transmission method in a fourth embodiment of the present invention.

Denoted in FIG. 17 at 1111 and 1101 are an input terminal and a transmission signal generator circuit which are the same as those in FIG. 8; also elements 1102-1104 are 1st-k-th antennas; elements 1105-1107 are level adjusters; and elements 1108-1110 are 1st-(k-1)th delay units. The detecting/demodulating method in the receiving end is substantially the same as the first and second embodiments in FIGS. 14-10.

When a single antenna is employed, a field strength difference from periphery to a center of a radio coverage is large. In contrast, as shown in FIG. 17, various paths exist from a plurality of antennas simultaneously herein; as a result, the field strength difference in the radio coverage is reduced. Also, the radio coverage can be intentionally deformed by displacing the antennas 1102-1104 and adjusting the level adjusters 1105-1107. Further, the transmission signals are strong enough to be against a multipath fading; therefore, arriving waves from the plural antennas effect equivalently to the multipath fading, and the BER characteristics may be improved by a path diversity effect.

The BER characteristics may be degraded if delay time differences between the arriving signals exceed the length of the center part. Therefore, it is preferable to suppress the delay time differences at the receiving end within a radio coverage by inserting the delay units 1108-1110.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A method of generating a digital transmission signal of a binary or M-ary data sequence where M is greater than 2, each data in the data sequence corresponding to a time slot which includes a first connection part, a center part, and a second connection part, in which the first connection part of a present time slot is a phase transition waveform which is linked to the second connection part of a time slot preceding the present time slot; tile center part of the present time slot is a first center phase transition waveform which excludes a phase discontinuity, which has a varied primary differential coefficient, and which is identical in shape to a second center phase transition waveform in another center part spaced therefrom by a prescribed number of time slots and said first and second center phase transition waveforms are shifted from each other according to the data; the second connection part of a present time slot is a phase transition waveform which is connected to the first connection part of a time slot succeeding to the present time slot; and a plurality of phase transition waveforms are stored in a waveform memory for each of the parts, said method comprising the steps of:

reading the phase transition waveforms out of tile waveform memory, according to the data of a present time slot and the data of a time slot preceding the present time slot, and generating the phase transition waveform in the first connection part of the present time slot which continues on the second connection part of the time slot preceding the present time slot without a discontinuity even at a linking point between the two time slots;

reading the phase transition waveform out of the waveform memory according to the data of a present time slot, and generating the phase transition waveform in the center part of the present time slot which continues on the first connection part of the present time slot without a discontinuity even at a linking point between the parts of the present time slot;

reading the phase transition waveforms out of the waveform memory according to the data of a present time slot and the data of a time slot succeeding to the present time slot, and generating the phase transition waveform in the second connection part of the present time slot which continues to the first connection part of the time slot succeeding to the present time slot without a discontinuity even at a linking point between the time slots; and combining the generated phase transition waveforms to thereby form the digital transmission signal.

2. The digital signal transmission method of claim 1, wherein the phase transition waveform in the center part of each time slot is a phase transition waveform of a concave or convex function.

3. The digital signal transmission method of claim 2, wherein the concave or convex function is a secondary function.

4. The digital signal transmission method of claim 1, wherein the phase transition waveform in each connection part is a straight or broken line.

5. The digital signal transmission method of claim 1, wherein the phase transition waveform in each connection part is a curved line where no discontinuity is included in a primary differential coefficient even at a linking point between the connection part and the corresponding center part.

6. The digital signal transmission method of claim 1, wherein the prescribed time slot number is 1, 2 or greater; and the phase transition waveform in each center part of every time slot is identical to each other in shape.

7. The digital signal transmission method of claim 1, wherein the prescribed time slot number is 2 or greater, and the phase transition waveform in each center part of the time slots have a plurality of waveform shapes.

8. The digital signal transmission method of claim 1, wherein a phase difference at the linking point between the phase transition waveform in the connection part and the phase transition waveform in the center part is other than 180°.

9. A digital signal transmission method comprising the steps of:

generating a plurality of delayed transmission signals by delaying the digital transmission signal cited in claims 1, 2, 3, 4, 5, 6, 7, or 8;

adjusting the delay times, each of which was applied to each delayed transmission signal, to be within a predetermined range;

transmitting the delayed transmission signals from a plurality of antennas into air, wherein due to the adjustment, an arriving delay time difference at a receiver of the delayed transmission signals is shorter than the length of a center part.

10. A digital signal transmission device for transmitting a signal which was generated by modulating a carrier wave according to a binary or an M-ary data sequence where M is greater than 2, comprising:

a differentially encoding means for converting the original data sequence into a transmission data sequence where information to be transmitted is present in a difference between two data which are spaced from each other by prescribed time slots;

a waveform generation means for generating a phase transition waveform in each time slot which corresponds to each data included in the transmission data sequence, the phase transition waveform including a center part and a connection part for linking the center parts in adjacent time slots, in which a phase transition waveform in the center part of a present time slot is generated according to a corresponding original data, then a phase transition waveform in the connection part of tile present time slot is generated so that it continues on tile phase transition waveforms in the center parts of time slots succeeding to and preceding the present time slot without a discontinuity even at a linking point between any two time slots: and a modulation means for modulating the carrier wave according to a signal which has the phase transition waveform generated by the waveform generation means.

11. The digital signal transmission device of claim 10, wherein the waveform generation means comprises a readout control means, a waveform storage means, and a D/A (Digital/Analog) converter means, the readout control means for providing the transmission data which corresponds to a present time slot together with the transmission data each of which corresponds to time slots succeeding to and preceding the present time slot as readout addresses, and controlling a reading of the waveform storage means according to the readout addresses;

the waveform storage means for storing a digitized phase transition waveform in the center part according to the transmission data which corresponds to the present time slot and storing a digitized phase transition waveform in the connection parts according to the transmission data each of which corresponds to the time slots succeeding to and preceding the present time slot, and outputting the phase transition waveform in the center or connection part according to the readout address supplied from the readout control means; and a Digital/Analog (D/A) converter for converting the digitized phase transition waveform derived from the waveform storage means into analog.

12. The digital signal transmission device of claim 11, wherein the waveform storage means stores a phase transition waveform of a concave or convex function as the phase transition waveform in the center part.

13. The digital signal transmission device of claim 12, wherein the waveform storage means stores a phase transition waveform of a secondary function as the concave or convex function.

14. The digital signal transmission device of claim 11, wherein the waveform storage means stores a phase transition waveform shown by a straight or broken line as the phase transition waveform in the connection part.

15. The digital signal transmission device of claim 11, wherein the waveform storage means stores a phase transition waveform shown by a curved line where no discontinuity is included in a Primary differential coefficient even at a linking point between each connection part and the corresponding center part.

16. The digital signal transmission device of claim 11, wherein the waveform storage means stores the phase transition waveform in the center part of each time slot which is identical to each other in shape.

17. The digital signal transmission device of claim 11, wherein the prescribed time slot number in the differential encoding means is 2 or more, and the phase transition waveforms in the center parts stored in the waveform storage means include a plurality of shapes.

18. The digital signal transmission device of claim 11, wherein the waveform storage means stores a phase difference at the linking point between the phase transition waveform in the connection part and the phase transition waveform in the center part being other than 180°.

19. The digital signal transmission device cited in claims 10, 11, 12, 13, 14, 15, 16, 17, or 18, comprising:

a plurality of antennas for transmitting digital transmission signals into air; and a plurality of delay means liar delaying each digital transmission signal from the digital signal transmission device differently, and providing a delayed digital transmission signal from one of a plurality of antennas into air; and an adjustment means for adjusting the delay time applied by each delay means to be within a predetermined range, so that an arriving delay time difference at a receiver of the digital transmission signals is shorter than the length of a center part.

* * * * *